(12) United States Patent
Takagi et al.

(10) Patent No.: US 6,388,843 B1
(45) Date of Patent: May 14, 2002

(54) SUSPENSION FOR DISC DRIVE

(75) Inventors: Yasuji Takagi, Ebina; Koji Uozumi, Isehara; Akihiro Takei, Aiko-gun, all of (JP); Jyun Soga, Cupertino, CA (US); Kenichi Takigawa, Aiko-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 09/406,242

(22) Filed: Sep. 24, 1999

(30) Foreign Application Priority Data

Jan. 4, 1999 (JP) .......................................... 11-000159

(51) Int. Cl.[7] ............................................... G11B 21/16
(52) U.S. Cl. ................................................... 360/245.7
(58) Field of Search ............................. 360/245, 245.7

(56) References Cited

U.S. PATENT DOCUMENTS

| | | | |
|---|---|---|---|
| 6,046,883 A | * 4/2000 | Miller | ...................... 360/245.7 |
| 6,067,209 A | 5/2000 | Aoyagi et al. | ........... 360/245.7 |
| 6,069,773 A | 5/2000 | Frater et al. | ............. 360/245.7 |
| 6,172,853 B1 | 1/2001 | Davis et al. | ............. 360/245.7 |

\* cited by examiner

*Primary Examiner*—David Davis
(74) *Attorney, Agent, or Firm*—Frishauf, Holtz, Goodman, Langer & Chick, P.C.

(57) ABSTRACT

A suspension for disc drive having a load beam and a flexure is provided with a limiter mechanism for regulating the movement of the flexure. The flexure includes a tongue portion provided with a magnetic head slider and a pair of outrigger portions situated individually on the opposite sides of the tongue portion. The limiter mechanism is provided with a nipping portion that is formed by bending part of the load beam. The nipping portion includes a first checking portion facing one surface of the flexure across a gap, a connecting portion situated ahead of the flexure, and a second checking portion extending rearward from the connecting portion and facing the other surface of the flexure across a gap.

1 Claim, 7 Drawing Sheets

SUSPENSION FOR DISC DRIVE

BACKGROUND OF THE INVENTION

The present invention relates to a suspension for supporting a magnetic head slider of a magnetic disc drive or photomagnetic disc drive incorporated in an information processing apparatus, such as a personal computer, portable computer, etc.

A hard disc drive (HDD) includes a carriage that can turn around a shaft. The carriage is turned around the shaft by means of a positioning motor. The carriage is provided with an arm, a suspension on the distal end portion of the arm, a head portion attached to the suspension, etc. The head portion is provided with a magnetic head slider that is situated in a position such that it can face a recording surface (track) of a disc, a transducer held on the slider, etc. When the disc rotates at high speed, the slider is slightly lifted from the disc surface, whereupon an air bearing is formed between the disc and the slider.

FIG. 13 shows an example of a conventional suspension 7. The suspension 7 includes a load beam 11 formed of a precision thin plate spring, a flexure 12 formed of a very thin plate spring that is fixed to the distal end portion of the beam 11, a base plate 13 fixed to the proximal portion of the load beam 11, etc. A magnetic head slider 10 is mounted on a tongue portion 12a that is formed on the flexure 12. The flexure 12 has rather low stiffness such that the slider 10 that is slightly lifted from the disc can flexibly change its posture.

A hemispherical protrusion 15 is formed on the distal end portion of the load beam 11 so as to project toward the flexure 12 in the thickness direction thereof. The top of the protrusion 15 can engage the tongue portion 12a of the flexure 12. Thus, a head portion 8 can make three-dimensional displacements, such as pitching and rolling, around the protrusion 15. Since the protrusion 15 is depressed on the backside of the load beam 11, it is called a dimple in the art. In some cases, the protrusion 15 may be provided on the flexure 12 in place of the load beam 11.

If the conventional suspension 7 is subjected to an intolerable shock, the head portion 8 behaves unstably, so that the head portion 8 and the disc may be damaged in some cases. Thus, when the suspension 7 is shocked, the distal end portion of the load beam 11 may spring up, or the head portion 8 may pitch or roll. Accordingly, a corner portion of the head portion 8 runs against the disc surface, possibly resulting in damage to the head portion 8 or the disc. This drawback is promoted by dimple separation or separation between the flexure 12 and the protrusion 15, in particular.

In U.S. Pat. No. 5,333,085, 5,771,136 or 5,838,517, a limiter mechanism is described and proposed as means for restraining the dimple separation. In conventional limiter mechanisms, partial bent portions on a load beam, for example, are opposed in the bending direction of a flexure so that the flexure engages the bent portions when the displacement of the flexure reaches its tolerance limit. Alternatively, partial bent portions on the flexure are opposed to the load beam so that they engage the load beam to restrain the movement of the flexure when the displacement of the flexure reaches its tolerance limit. These conventional limiter mechanisms make the distal end portion of the suspension wider.

As shown in FIG. 14, the suspension 7 moves around a shaft 2a of a carriage 2 in the direction of arrow M over a disc 9. When the suspension 7 is moved to the inner peripheral side of the disc 9, a fixed clearance C should be secured between a distal end portion 7a of the suspension and a hub ring 17. With use of the conventional limiter mechanisms that increase the width of the suspension end portion 7a, therefore, the data area on the disc 9 is reduced inevitably.

BRIEF SUMMARY OF THE INVENTION

Accordingly, the object of the present invention is to provide a suspension for disc drive, enjoying high shock resistance and capable of effectively restraining the movement of a flexure without increasing the width of its distal end portion.

In order to achieve the above object, a suspension according to the present invention comprises a flexure for supporting a magnetic head slider, a load beam for supporting the flexure, and a limiter mechanism for regulating the movement of the flexure, the limiter mechanism including a checking portion formed of part of the load beam extending rearward from the distal end of the flexure and facing the flexure across a gap in the thickness direction of the flexure.

According to the suspension of the invention constructed in this manner, the limiter mechanism that includes the checking portion on the load beam can restrain the posture of the flexure from being substantially changed by a shock and prevent dimple separation without increasing the stiffness of the flexure or changing the shape of the flexure. The distal end portion of the suspension with the limiter mechanism according to the invention cannot be wider than that of the conventional suspension.

According to the invention, the flexure includes a tongue portion provided with a magnetic head slider and a pair of outrigger portions situated individually on the opposite sides of the tongue portion, and the limiter mechanism is provided with a nipping portion including a first checking portion facing one surface of the flexure so as to restrain the tongue portion and the outrigger portions from bending in the thickness direction thereof and a second checking portion facing the other surface of the flexure. According to the suspension of the invention constructed in this manner, the limiter mechanism can regulate the displacements of the tongue portion and the outrigger portions that are shocked, thereby more effectively restraining the movement of the flexure in the pitching and rolling directions.

According to the invention, the limiter mechanism includes an extension portion for enlarging the area of opposition between the load beam and the flexure. The extension portion can more effectively restrain the movement of the shocked flexure.

According to the invention, moreover, the limiter mechanism includes a checking portion formed of part of the flexure extending rearward from the distal end of the load beam and facing the load beam across a gap in the thickness direction of the load beam. According to the suspension of the invention constructed in this manner, the limiter mechanism that includes the checking portion on the flexure can restrain the posture of the flexure from being substantially changed by a shock without increasing the stiffness of the flexure or changing the shape of the flexure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will now be described with reference to FIGS. 1 to 3 and 12.

Figure 12:
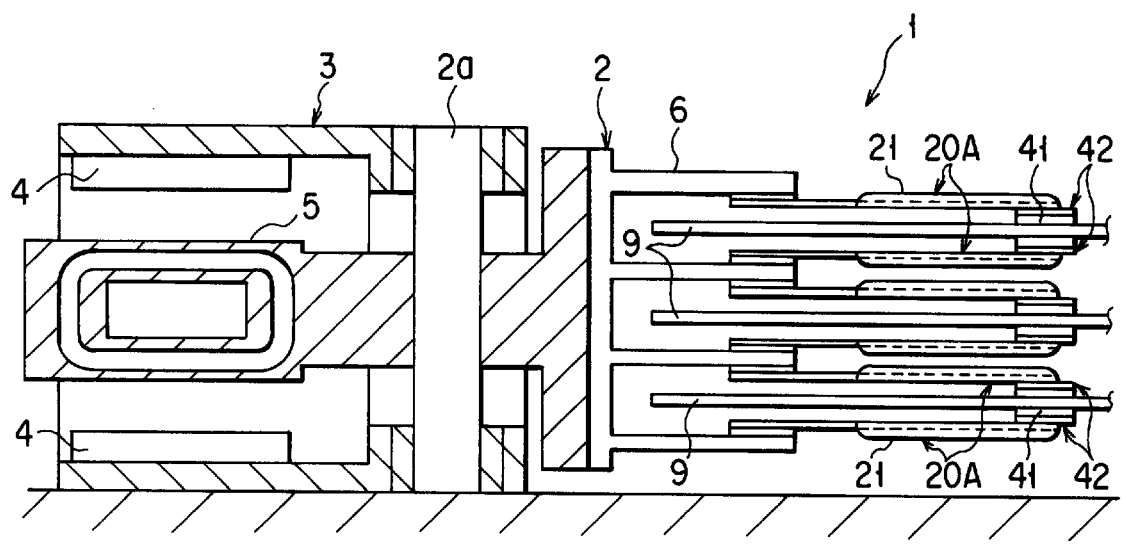
FIG. 12 is a side view, partially in section, showing a hard disc drive.

FIG. 12 shows part of a hard disc drive 1. A carriage 2 of the disc drive 1 is turned around a shaft 2a by means of a positioning motor 3. The carriage 2 is composed of a coil portion 5 located near a magnet 4 of a motor 3, arms 6 fixed to the coil portion 5, suspensions 20A located individually on the respective distal end portions of the arms 6, head portions 42 attached individually to the respective distal end portions of the suspensions 20A, etc. Each head portion 8 can be moved to a desired track (recording surface) of its corresponding disc 9 by actuating the carriage 2 by means of the motor 3.

Figure 1:
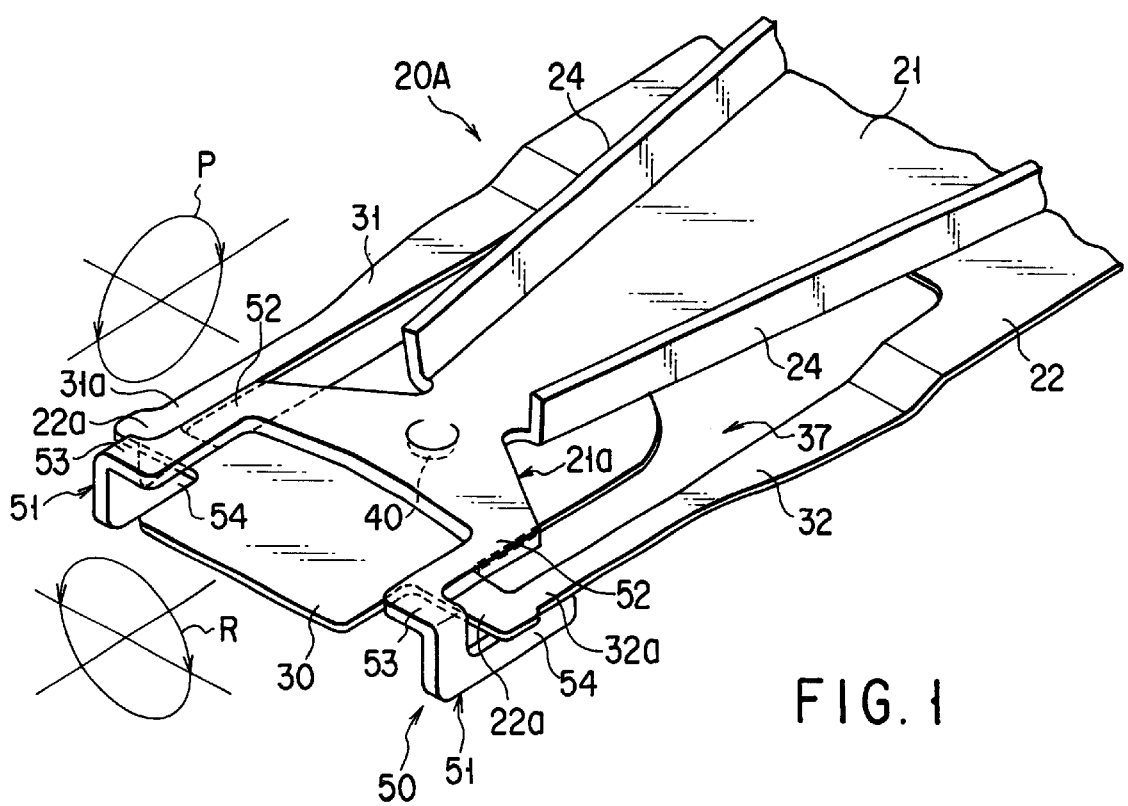
FIG. 1 is a partial perspective view of a suspension for disc drive according to a first embodiment of the present invention.
Figure 13:
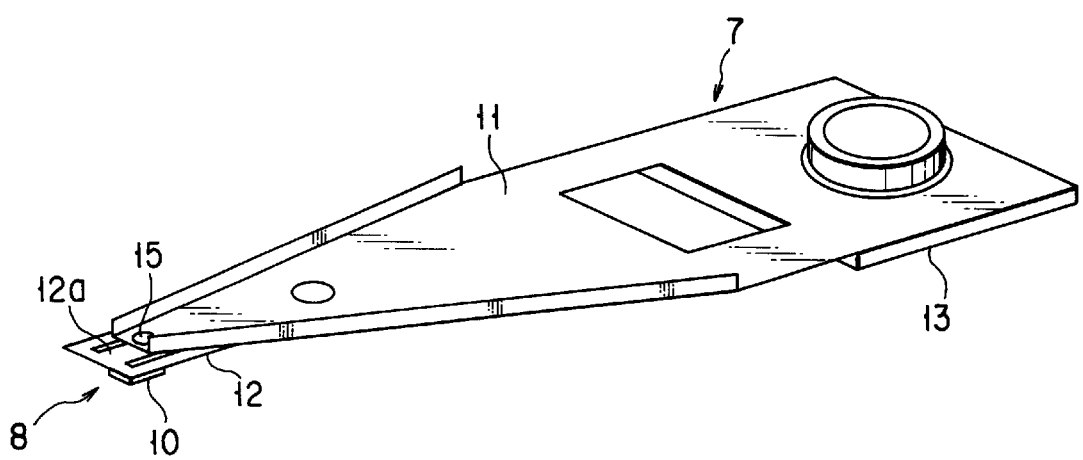
FIG. 13 is a perspective view showing a conventional suspension.
Figure 14:
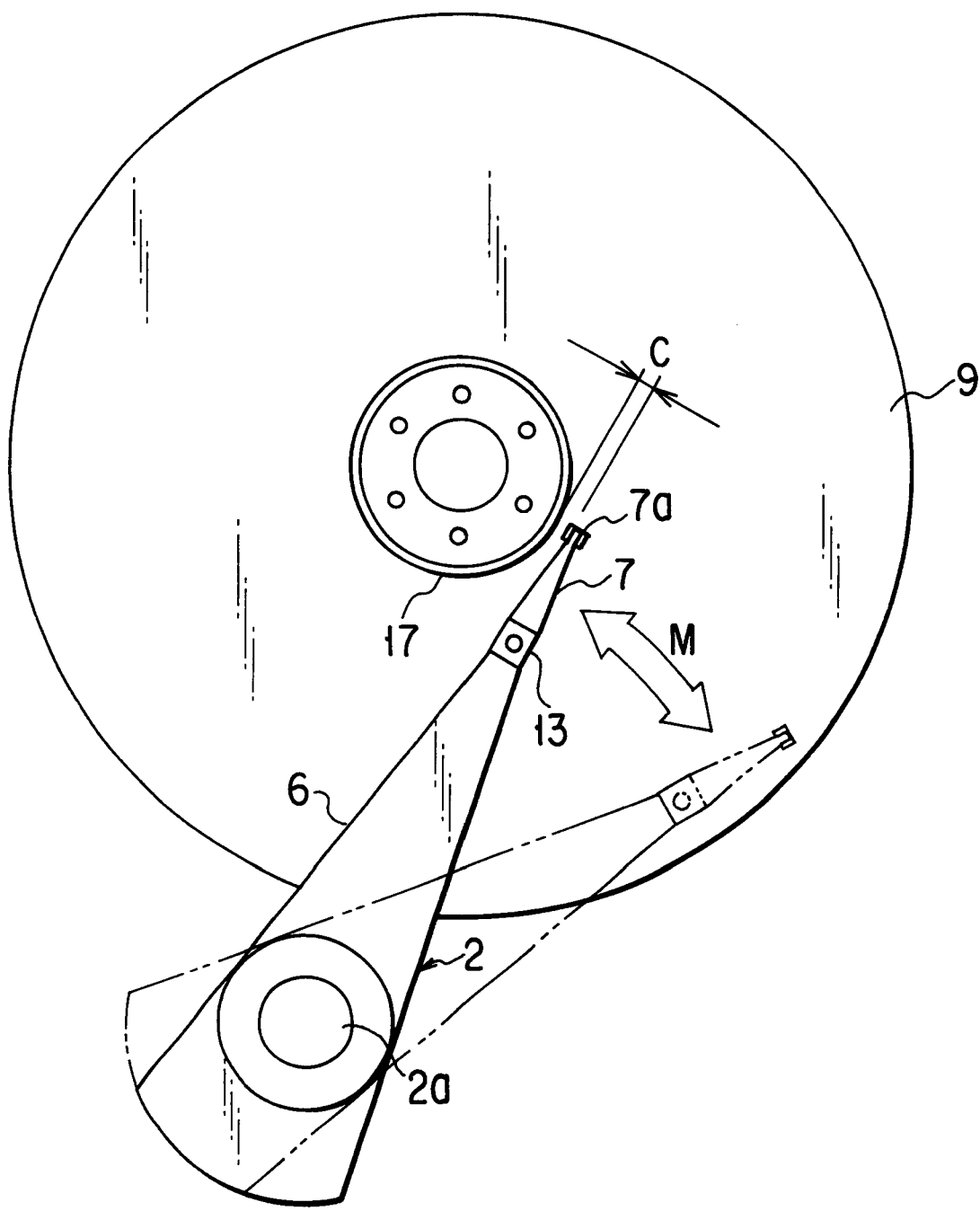
FIG. 14 is a plan view showing the suspension and a disc shown in FIG. 13.

An example of the suspension 20A shown in FIG. 1 includes a load beam 21 formed of a precision thin plate spring of stainless steel or the like and a flexure 22 formed of a very thin plate spring (thinner than the beam 21) that is fixed to the beam 21 by laser welding or the like. The flexure 22 is formed of a springy stainless-steel sheet with a thickness of about 18 μm to 30 μm, for example. A base plate similar to the conventional base plate 13 shown in FIG. 13 is attached to the proximal portion of the load beam 21. The load beam 21 is fixed to a carriage (e.g., carriage 2 shown in FIG. 12) by means of the base plate. A bent edge 24, called a box-bending, is formed on each side of the beam 21.

Figure 2:
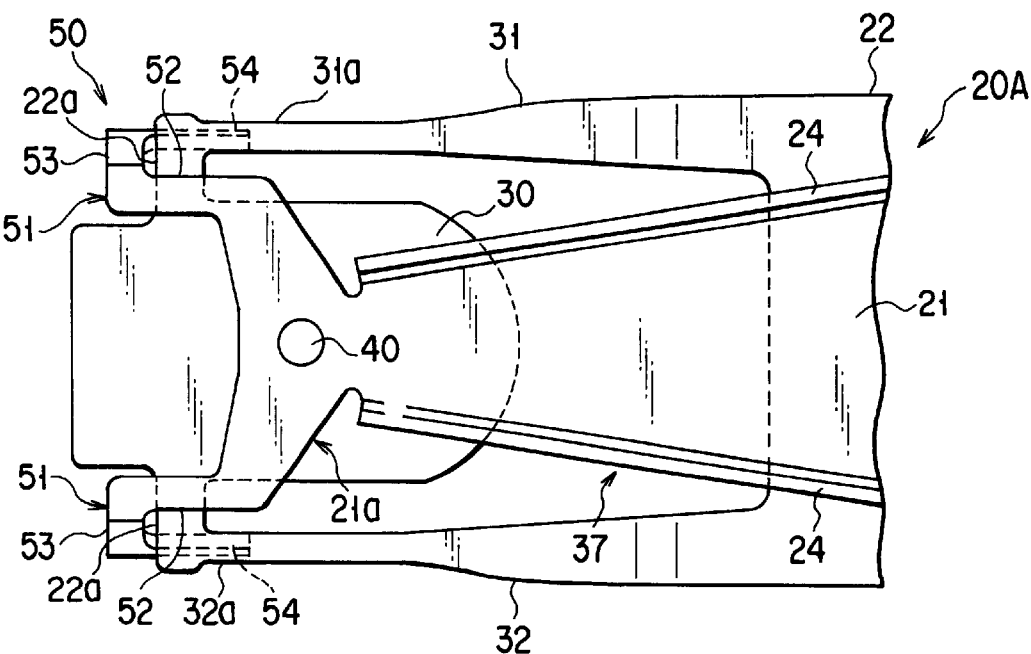
FIG. 2 is a partial plan view of the suspension shown in FIG. 1.

As shown in FIG. 2 and other drawings, the flexure 22 extends in the axial direction (longitudinal direction) of the load beam 21. The distal end portion of the flexure 22 is formed having a movable tongue portion 30 and a pair of outrigger portions 31 and 32, which are situated on the left- and right-hand sides of the tongue portion 30, respectively, and extend in the longitudinal direction of the flexure 22. The tongue portion 30 and the outrigger portions 31 and 32 can bend in the thickness direction of the flexure 22.

The opposite sides of the front end portion of the tongue portion 30 are connected to distal end portions 31a and 32a of the outrigger portions 31 and 32 by means of an end portion 22a extending in the width direction of the flexure 22. A gap 37 having a U-shaped plane configuration is formed around the tongue portion 30 by etching or the like. The tongue portion 30 and the outrigger portions 31 and 32 can bend in their pitch-angle direction (rotating direction indicated by arrow P in FIG. 1). A protrusion 40 is provided on a distal end portion 21a of the load beam 21. The protrusion 40 is in contact with one surface (top surface side in FIG. 3) of the tongue portion 30. Although the protrusion 40 projects hemispherically toward the tongue portion 30, it is called a dimple because it is depressed on the backside of the load beam 21.

Figure 3:
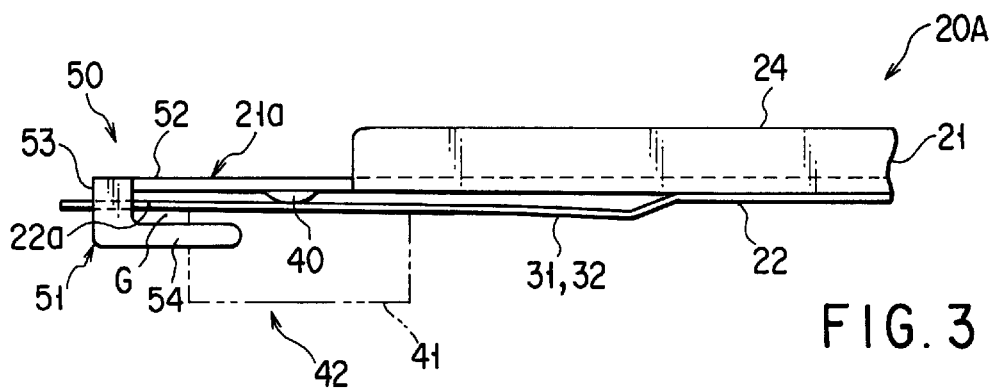
FIG. 3 is a partial side view of the suspension shown in FIG. 1.

The tongue portion 30 is provided with a magnetic head slider 41 (indicated by two-dot chain line in FIG. 3). The slider 41 is provided with a transducer (not shown) for use as a magnetoelectric conversion element. When a hard disc for use as a storage medium rotates at high speed, the slider 41 is slightly lifted from the disc surface, whereupon an air bearing is formed between the disc 9 and the slider 41. The tongue portion 30, slider 41, transducer, etc. constitute the head portion 42.

The top of the protrusion (dimple) 40 presses the tongue portion 30 of the flexure 22. Accordingly, the tongue portion 30, carrying the slider 41 thereon, can shift its position three-dimensionally in a pitching direction (direction of arrow P in FIG. 1) and a rolling direction (direction of arrow R in FIG. 1) around the protrusion 40. In some cases, the protrusion 40 may be provided on the flexure 22 in place of the load beam 21.

The suspension 20A is provided with a limiter mechanism 50 for regulating the movement of the flexure 22. The mechanism 50 includes a pair of nipping portions 51, left and right (on the underside in FIG. 3), which will be described below, the end portion 22a of the flexure 22, etc. The thickness-direction movement of the end portion 22a is regulated by the nipping portions 51.

Each nipping portion 51 is provided with a pair of first checking portion 52 extending forward from each corresponding side of the distal end portion 21a of the load beam 21 in the longitudinal direction of the beam 21, a connecting portion 53 extending sideways from the distal end of the first checking portion 52 and bent at about 90° in the thickness direction of the checking portion 52 (or downward in FIG. 3), and a second checking portion 54 extending rearward from an end of the connecting portion 53 in the longitudinal direction of the load beam 21.

Each first checking portion 52 faces its corresponding end portion 22a of the flexure 22 with a gap over one surface of the flexure 22 (or on the top surface side in FIG. 3). Each connecting portion 53 faces its corresponding end portion 22a of the flexure 22 with a gap in front of the end portion 22a. Each second checking portion 54 faces the distal end portion 31a or 32a of the outrigger portion 31 or 32 and the end portion 22a of the flexure 22 corresponding thereto with a gap under the other surface of the flexure 22 (or on the under surface side in FIG. 1). Thus, each end portion 22a of the flexure 22 penetrates a gap G between the first and second checking portions 52 and 54 without touching them, as shown in FIG. 3. The flexure 22 is fixed to the load beam 21. Accordingly, each end portion 22a of the flexure 22 can flexibly move in its thickness direction within the range of the gap G.

The following is a description of the function of the suspension 20A.

If the suspension 20A is shocked, the checking portions 52 and 54 and other portions of the limiter mechanism 50 can effectively restrain the pitching-direction movement of the magnetic head slider 41 that is lifted above the disc. Accordingly, the slider 41 can always touch the disc surface without substantially changing its horizontal posture. Thus, the possibility of the disc and the slider 41 being damaged is lowered substantially. The rolling-direction displacement of the slider 41 can be also restrained as the second checking portions 54 regulate the movement of their corresponding outrigger portions 31 and 32.

In this suspension 20A, the bent portions formed on the load beam 21, in conjunction with the distal end portion of the flexure 22, hold wide areas of the outrigger portions 31 and 32. Accordingly, the flexure 22 can be effectively restrained from fluttering when it is shocked. This fluttering restraining effect can be obtained because the movement of the flexure 22 in the pitching direction, as well as the movement in the vertical direction, can be restrained.

As the load beam 21 and the flexure 22 of the limiter mechanism 50 are joined together, the end portion 22a of the flexure 22 is inserted into the gap between the first and second checking portions 52 and 54 of each nipping portion 51. Thus, the flexure 22 can be inserted into a predetermined position on the load beam 21 by only being slid in one direction with respect to the beam 21. Accordingly, the flexure 22 need not be positioned with high accuracy with respect to the load beam 21 as it is inserted, so that the process of insertion can be simplified to improve the yield.

Besides, the distal end portion of the suspension 20A need not be widened for the limiter mechanism 50. Thus, the data area on the disc can be prevented from being reduced and can maintain the same value as in the case of a suspension that is provided with no limiter mechanism.

The limiter mechanism 50 according to the present embodiment can be obtained by only bending the nipping portions 51, which are attached to the distal end portion 21a of the load beam 21, without bending the flexure 22. Further, the nipping portions 51 are expected to be provided only on part of the load beam 21 without requiring use of any other components. Thus, the number of essential components can be reduced, and the construction can be simplified.

Figure 4:
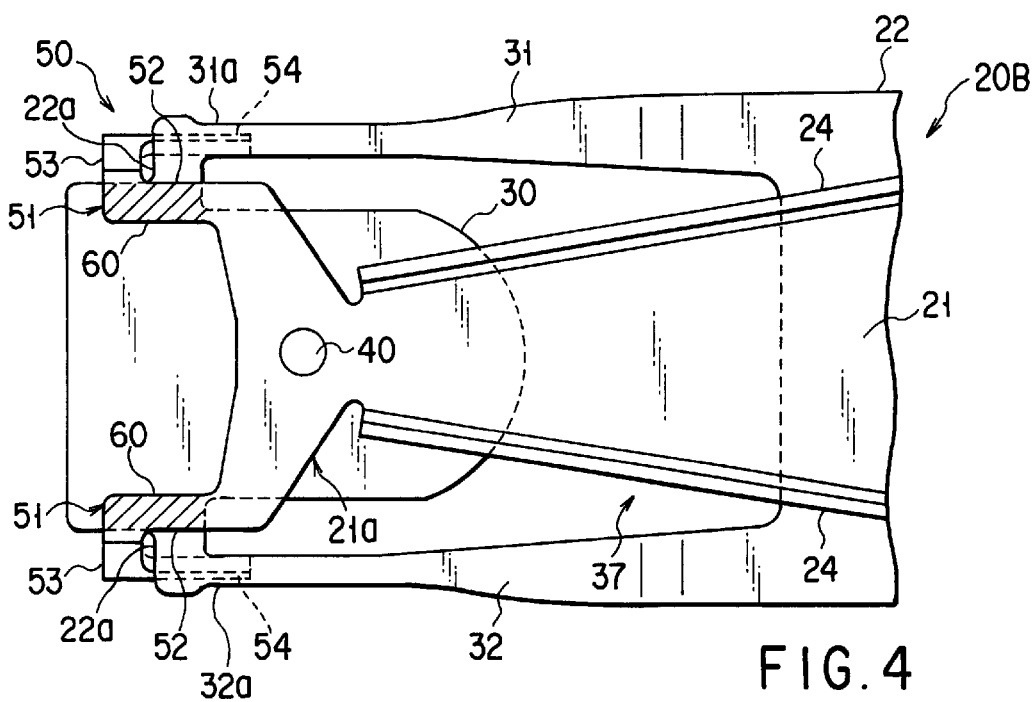
FIG. 4 is a partial plan view of a suspension for disc drive according to a second embodiment of the invention.
Figure 5:
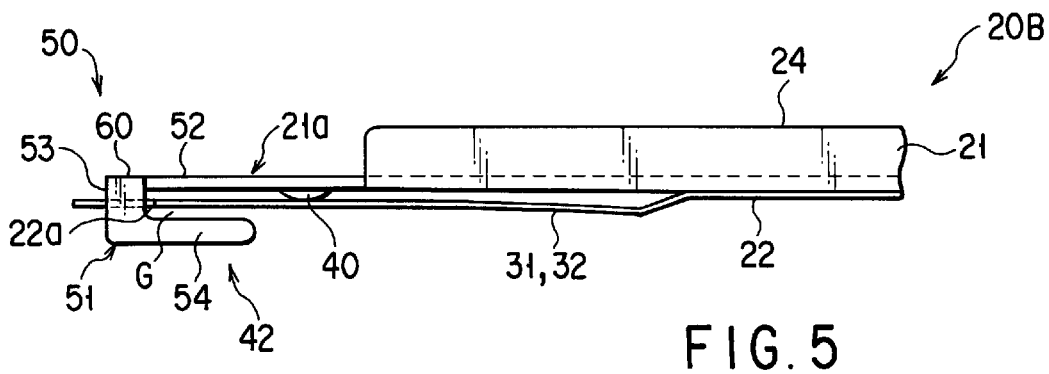
FIG. 5 is a partial side view of the suspension shown in FIG. 4.

FIGS. 4 and 5 show a suspension 20B according to a second embodiment of the present invention. The suspension 20B shares its construction and operation or function with the suspension 20A according to the first embodiment except for some difference in the arrangement of the limiter mechanism 50. In FIGS. 1 to 5, therefore, common portions are designated by common reference numerals throughout the views, and a description of those portions is omitted.

In the limiter mechanism 50 of the suspension 20B according to the second embodiment, extension portions 60 for enlarging the area of opposition between a load beam 21 and a flexure 22 are formed by extending a distal end portion 22a of the flexure 22 forward. The extension portions 60 enable nipping portions 51 of the load beam 21 and the flexure 22 to overlap one another in wider regions, as indicated by hatching in FIG. 4. Thus, the flexure 22 can be restrained more effectively from moving when it is shocked.

Figure 6:
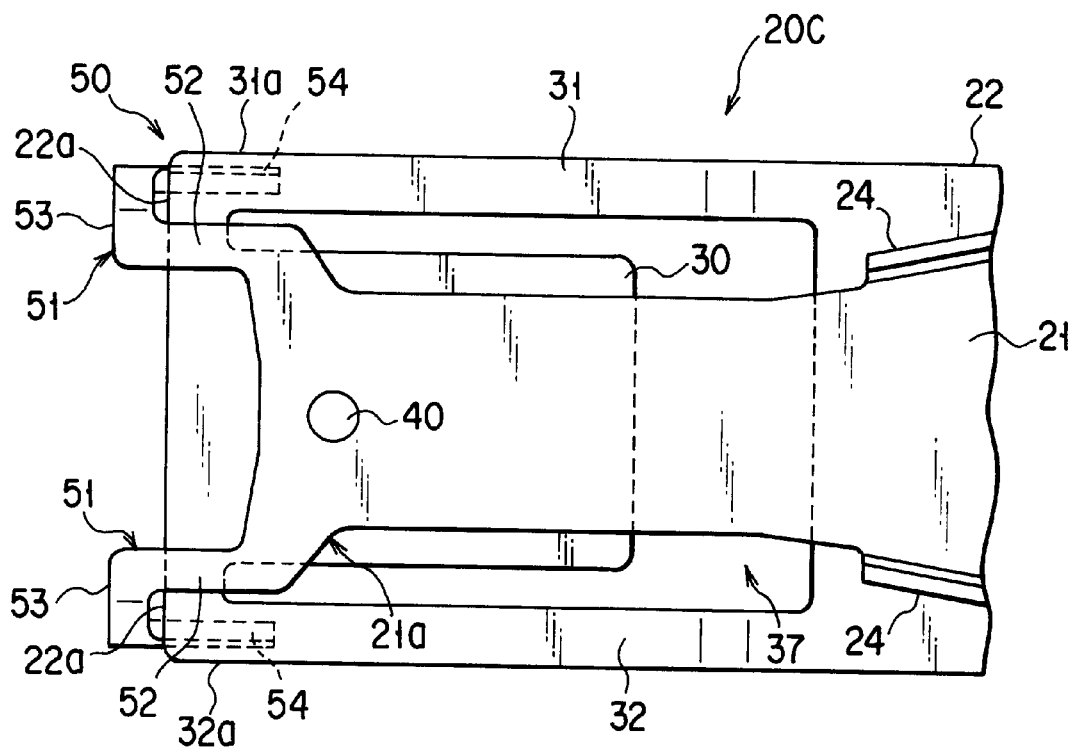
FIG. 6 is a partial plan view of a suspension for disc drive according to a third embodiment of the invention.
Figure 7:
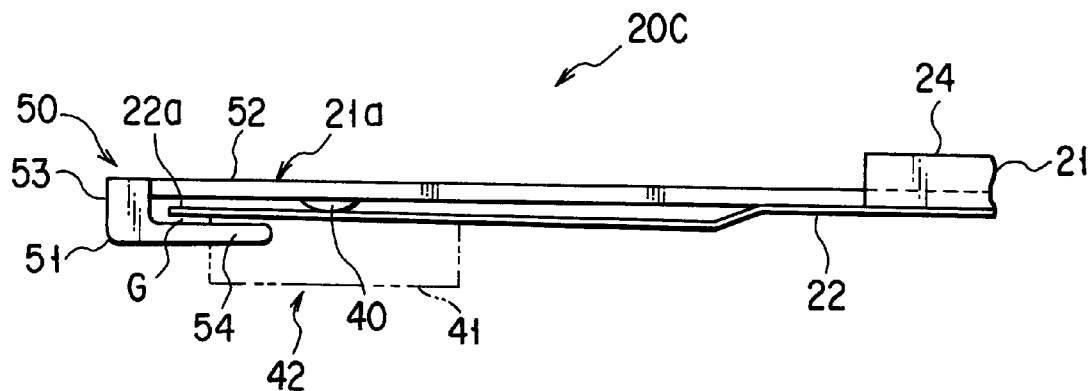
FIG. 7 is a partial side view of the suspension shown in FIG. 6.

FIGS. 6 and 7 show a suspension 20C according to a third embodiment of the invention. The suspension 20C is somewhat different from the suspension 20A according to the first embodiment (FIGS. 1 to 3) in the respective shapes of the load beam 21 and the flexure 22. Bent edges 24 of the load beam 21 of the suspension 20C extend short of a tongue portion 30. The tongue portion 30 and outrigger portions 31 and 32 according to this embodiment have simpler shapes than those of the flexures according to the two foregoing embodiments. For other components, the suspension 20C shares its construction and operation or function with the suspension 20A. In FIGS. 1 to 7, therefore, common portions are designated by like reference numerals throughout the views, and a description of those portions is omitted.

Figure 8:
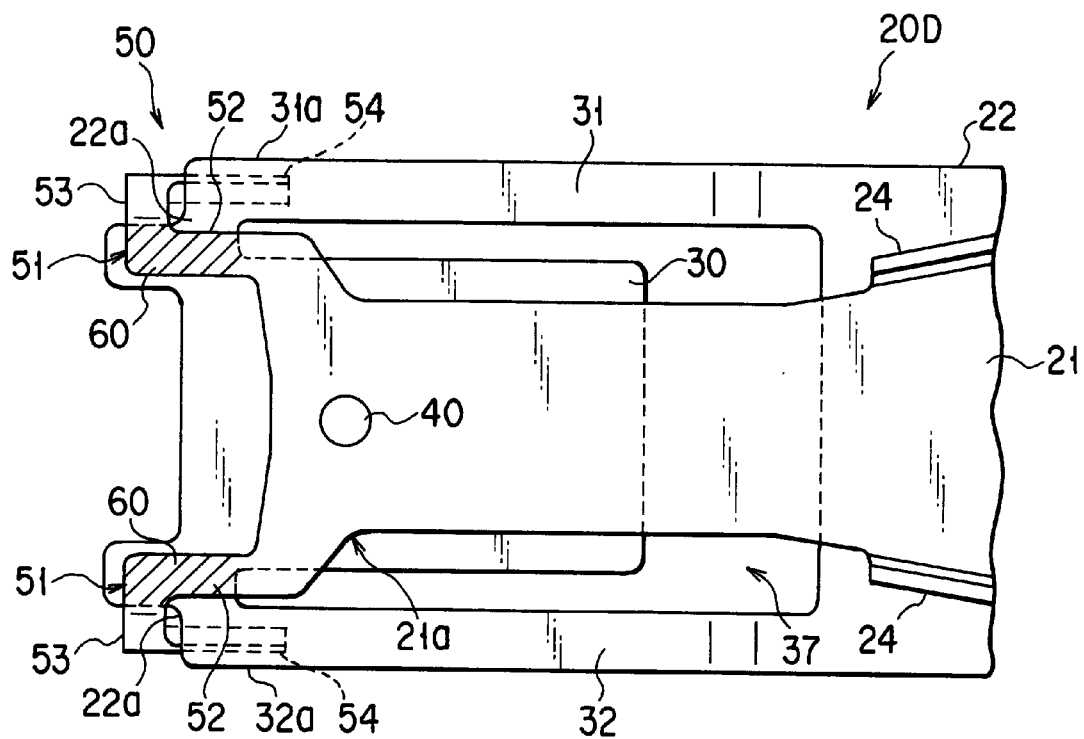
FIG. 8 is a partial plan view of a suspension for disc drive according to a fourth embodiment of the invention.
Figure 9:
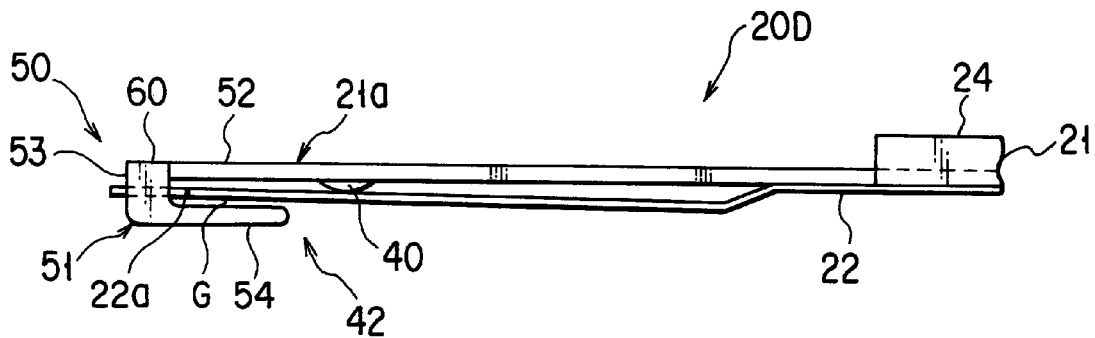
FIG. 9 is a partial side view of the suspension shown in FIG. 8.

FIGS. 8 and 9 show a suspension 20D according to a fourth embodiment of the invention. In a limiter mechanism 50 of the suspension 20D, extension portions 60 for enlarging the area of opposition between a load beam 21 and a flexure 22 are formed by extending forward the distal end portion 22a of the flexure 22 of the suspension 20C according to the third embodiment. The extension portions 60 enable nipping portions 51 of the load beam 21 and the flexure 22 to overlap one another in wider regions, as indicated by hatching in FIG. 8. Thus, the movement of the flexure 22 can be restrained more effectively.

Figure 10:
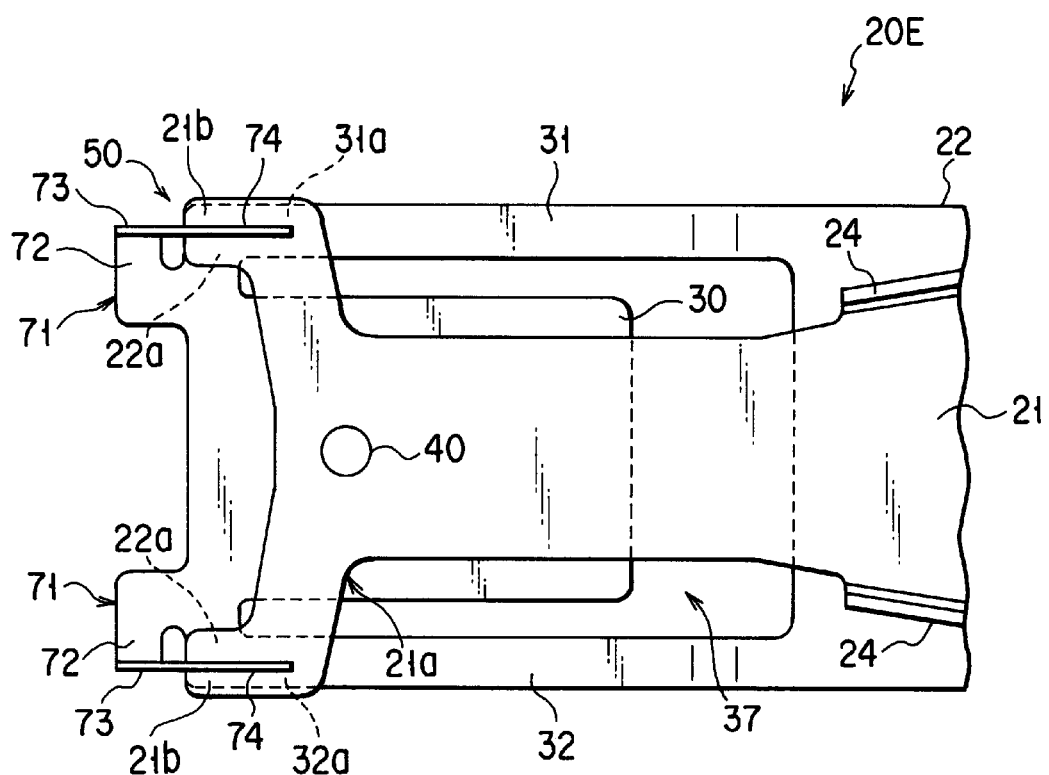
FIG. 10 is a partial plan view of a suspension for disc drive according to a fifth embodiment of the invention.
Figure 11:
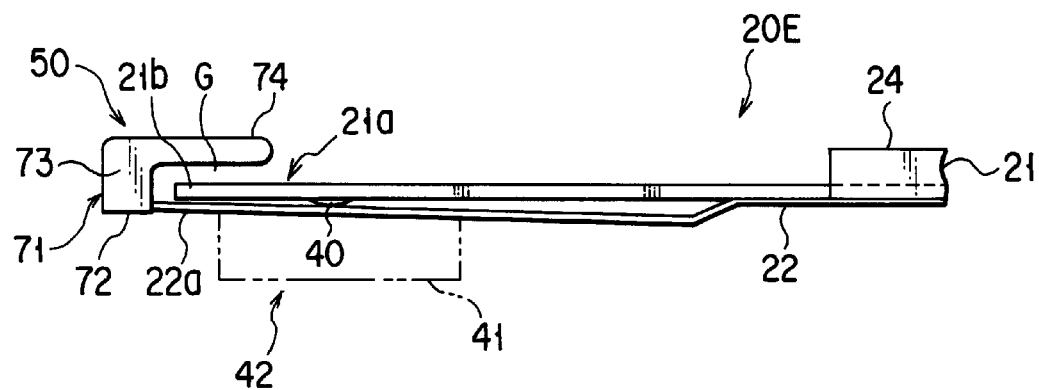
FIG. 11 is a partial side view of the suspension shown in FIG. 10.

FIGS. 10 and 11 show a suspension 20E according to a fifth embodiment of the invention. A limiter mechanism 50 of the suspension 20E is provided with nipping portions 71 that are formed on a flexure 22. The movement of the flexure 22 is restrained as the movement of the nipping portions 71 is checked by extending distal end portions 21b of a load beam 21 when the suspension 20E is shocked. For other components, the suspension 20E shares its basic construction and function with the suspensions according to the foregoing embodiments. In FIGS. 1 to 11, therefore, common portions are designated by like reference numerals throughout the views, and a description of those portions is omitted.

The nipping portions 71 of the suspension 20E according to the fifth embodiment comprise respective end portions 22a of the flexure 22, a pair of extending portions 71 extending forward from each corresponding side of the end portions 22a in the longitudinal direction of the flexure 22, connecting portions 73 extending sideways from each extending portion 72 and bent at about 90° in the thickness direction of each extending portion 72 (or upward in FIG. 11), and checking portions 74 extending rearward from an end of each connecting portion 73 in the longitudinal direction of the flexure 22.

Each end portion 22a of the flexure 22 faces its corresponding extending distal end portion 21b of the load beam 21 with a gap on one surface side of the beam 21 (or on the under surface side of the load beam 21 in FIG. 11). Each connecting portion 73 faces its corresponding extending distal end portion 21b of the load beam 21 with a gap in front of the end portion 21b. Each checking portion 74 faces its corresponding end portion 21b with a gap on the other surface side of the end portion 21b (or on the top surface side of the load beam 21 in FIG. 11). Thus, each distal end portion 21b of the load beam 21 can penetrate a gap G between the end portion 22a of the flexure 22 and the checking portion 74 corresponding thereto. In this case, therefore, the process of insertion of the flexure 22 in position on the load beam 21 can be also carried out with ease.

It is to be understood that the present invention may be carried out with the respective configurations of various components that constitute the invention, including the load beams, flexures, head portions, movable parts (outrigger portions and tongue portions), checking portions of the limiter mechanisms, etc., changed or modified as required.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for disc drive, comprising:

a flexure including a tongue portion for mounting a magnetic head slider;

a load beam for supporting the flexure; and a limiter mechanism for regulating movement of the flexure, the limiter mechanism including checking portions facing an end portion of the flexure;

wherein a gap is preserved in a thickness direction of the flexure;

wherein the checking portions comprise a pair of first checking portions extending forward from a distal end portion of the load beam in a longitudinal direction of the load beam, and a pair of second checking portions extending rearward from a distal end of the flexure;

wherein the limiter mechanism further includes connecting portions respectively connecting the first and second checking portions; and wherein the connecting portions are provided forward of the distal end of the flexure, and the second checking portions individually extend rearward from the connecting portions in the longitudinal direction of the load beam.

* * * * *

UNITED STATES PATENT AND TRADEMARK OFFICE
CERTIFICATE OF CORRECTION

PATENT NO. : 6,388,843 B1
DATED : May 14, 2002
INVENTOR(S) : Yasuji Takagi

It is certified that error appears in the above-identified patent and that said Letters Patent is hereby corrected as shown below:

<u>Title page,</u>
Item [56], References Cited, U.S. PATENT DOCUMENTS, add
-- 5,333,085    7/1994        Prentice et al
   5,771,136    6/1998        Girard
   5,838,517    11/1998       Frater et al --.

Signed and Sealed this

Ninth Day of September, 2003

JAMES E. ROGAN
*Director of the United States Patent and Trademark Office*